United States Patent [19]

Klippel

[11] Patent Number: 6,163,265
[45] Date of Patent: Dec. 19, 2000

[54] VOLTAGE SENSING ARRANGEMENT

[75] Inventor: Todd W. Klippel, Oak Park, Ill.

[73] Assignee: S&C Electric Company, Chicago, Ill.

[21] Appl. No.: 09/283,047

[22] Filed: Apr. 1, 1999

[51] Int. Cl.[7] .................................................. G08B 21/00
[52] U.S. Cl. .......................................... 340/660; 324/522
[58] Field of Search ................................... 340/657, 660;
324/522, 523, 527

[56] References Cited

U.S. PATENT DOCUMENTS

| | | | |
|---|---|---|---|
| 3,978,465 | 8/1976 | Goode | 340/651 |
| 4,002,976 | 1/1977 | Zulaski | 324/126 |
| 4,104,539 | 8/1978 | Hase | 307/64 |
| 4,706,011 | 11/1987 | Vergara et al. | 323/274 |
| 4,868,505 | 9/1989 | Stahl | 324/511 |
| 5,184,026 | 2/1993 | Breartuin | 307/139 |
| 5,220,495 | 6/1993 | Zulaski | 363/84 |
| 5,521,567 | 5/1996 | Devonald, III et al. | 335/132 |
| 5,864,107 | 1/1999 | French et al. | 200/50.01 |
| 5,910,775 | 6/1999 | Mears et al. | 340/815.4 |
| 5,973,511 | 10/1999 | Hsia et al. | 326/81 |

*Primary Examiner*—Edward Lefkowitz
*Attorney, Agent, or Firm*—James V. Lapacek

[57] ABSTRACT

A voltage sensing arrangement is provided that facilitates accurately measuring a sensed voltage while also providing isolation to a sensing path during a test mode of an associated indicator arrangement. The voltage sensing arrangement includes a voltage sensor that is arranged to sense the voltage on an associated power distribution line. A first arrangement is responsive to the voltage sensor for providing an output representing the voltage on the associated power distribution line. The voltage sensing arrangement includes a second arrangement that is responsive to the voltage sensor for isolating the first arrangement from the voltage sensor whenever voltage is not present on the associated power distribution line. In a preferred embodiment, a third arrangement is provided that is responsive to the presence of voltage on the associated power distribution line for isolating a test path from the voltage sensor.

16 Claims, 1 Drawing Sheet

VOLTAGE SENSING ARRANGEMENT

BACKGROUND OF THE INVENTION

1. Field of the Invention

The present invention relates generally to voltage sensing arrangements and indicator arrangements for switchgear and the like in the field of electrical power distribution, and more particularly to an arrangement that facilitates accurately measuring a sensed voltage while also providing isolation to a sensing path during a test mode of an associated indicator arrangement.

2. Description of the Related Art

Various prior art voltage sensors provide an output proportional to a sensed voltage. For example, see: U.S. Pat. Nos. 4,002,976 and 5,220,495. In systems for switchgear in the power distribution field, voltage indicator arrangements are provided that respond to sensed voltage signals. Some of these include arrangements for testing the integrity of the voltage sensing system, for example, as shown in U.S. Pat. Nos. 5,521,567 and 5,864,107 and in co-pending application Ser. No. 08/788,158 filed Jan. 24, 1997 in the names of G. Mears et al.

While these prior art arrangements may be useful to provide various voltage sensing and indicator arrangements, these arrangements do not generally provide the most accurate sensing of voltage while also providing for the appropriate functioning of a voltage indicator.

SUMMARY OF THE INVENTION

Accordingly, it is a principal object of the present invention to provide a voltage sensing arrangement that facilitates accurately measuring a sensed voltage while also providing isolation to a sensing path during a test mode of an associated indicator arrangement.

It is another object of the present invention to provide a voltage sensing arrangement that disables a test signal path to a voltage sensor when voltage is present at an input to the voltage sensor.

These and other objects of the present invention are efficiently achieved by the provision of a voltage sensing arrangement that facilitates accurately measuring a sensed voltage while also providing isolation to a sensing path during a test mode of an associated indicator arrangement. The voltage sensing arrangement includes a voltage sensor that is arranged to sense the voltage on an associated power distribution line. A first arrangement is responsive to the voltage sensor for providing an output representing the voltage on the associated power distribution line. The voltage sensing arrangement includes a second arrangement that is responsive to the voltage sensor for isolating the first arrangement from the voltage sensor whenever voltage is not present on the associated power distribution line. In a preferred embodiment, a third arrangement is provided that is responsive to the presence of voltage on the associated power distribution line for isolating a test path from the voltage sensor.

BRIEF DESCRIPTION OF THE DRAWING

The invention, both as to its organization and method of operation, together with further objects and advantages thereof, will best be understood by reference to the specification taken in conjunction with the accompanying drawing FIG. 1 which is an electrical schematic and block diagram representation of a voltage sensing arrangement of the present invention.

DETAILED DESCRIPTION

Figure 1:
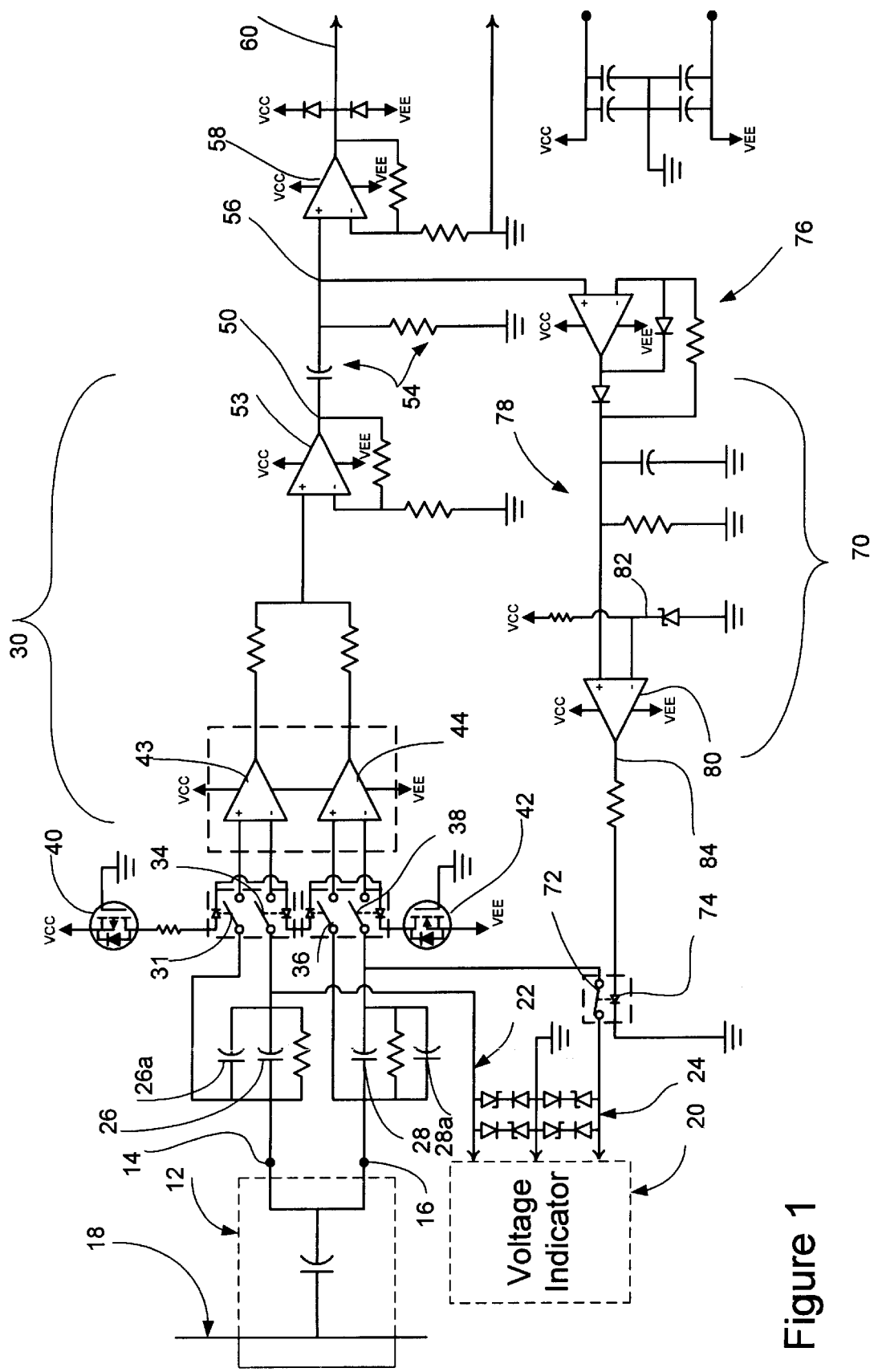

Referring now to FIG. 1, the voltage sensing arrangement 10 of the present invention utilizes a capacitive tap configuration 12 including sensing leads 14, 16 to sense the voltage on a medium voltage power distribution line 18, e.g. one phase of a three-phase alternating current electrical system. In a preferred arrangement, the voltage sensing arrangement 10 is arranged to operate with a voltage indicator arrangement 20. The voltage indicator arrangement 20 receives a voltage indicating signal at 22 and provides a sensing path test signal at 24. The voltage indicating signal 22 is connected to the sensing lead 14 through a coupling capacitor 26. The sensing path test signal 24 is connected to the sensing lead 16 via a coupling capacitor 28.

The voltage indicating signal 22, the sensing path test signal 24, and the sensing leads 14, 16 form four sensing signal inputs to an amplifier stage 30. The inputs 14, 16, 22 and 24 are connected to the amplifier stage 30 through respective selectively operable circuit paths 32, 34, 36 and 38, depicted as single-pole single-throw switches in FIG. 1 and utilized to provide an isolating function for desirable operation of the voltage indicator 20 when no voltage is present on the line 18. In one specific embodiment, the switches 32–38 are provided by photo-mosfet devices and controlled by two transistors 40, 42 connected across the supply lines. Thus, unless the supply voltages are present, the switches 32–38 provide an open circuit, providing a circuit path only when both supply voltages are present. Accordingly, when no voltage is present at 18, the voltage indicator arrangement 20 functions via the sensing path test signal at 24 to provide an appropriate test voltage through the voltage sensor 12 so as to supply a voltage indicating signal at 22 to test the operation of the voltage indicator arrangement 20 as more fully explained in the aforementioned U.S. Pat. Nos. 5,521,567 and 5,864,107 to which reference may be made for a more detailed discussion. In this mode, when no voltage is present at 18, the voltage sensing arrangement 10 does not affect the operation of the voltage indicator arrangement 20.

The amplifier stage 30 via two amplifiers 43, 44 and a summing amplifier 53 provides a sensed voltage output signal at 50 according to the relationship:

$$V_{at\ 18} \cong (C_{26}/C)(V_{across\ C26}) + (C_{28}/C)(V_{across\ C28});$$

where C26 is the capacitance of the capacitor 26, C28 is the capacitance of the capacitor 28, and C is the capacitance of the capacitive tap configuration 12, which may also be characterized as a bushing, approximately 50 picofarads in a specific embodiment. The output signal at 50 is then processed through a high-pass filter stage at 54 to remove any dc offset of the signal and provide at 56 a signal to a scaling amplifier stage 58 providing a voltage sensed signal at 60 that represents the voltage at 18.

In order to provide an accurate sensed signal at 60 when typical voltage levels are present at 18, a control arrangement 70 is provided to open the circuit path of the sensing path test signal 24 at 72, illustrated as a single-pole single-throw switch path in FIG. 1. In one specific embodiment, the switch path at 72 is provided by a photo-mosfet device illustrated by a diode 74 controlling the path 72. When the sensed voltage signal at 56 is present at a predetermined level, the control arrangement 70 opens the path 72. For example, this feature is operative when the voltage at 18 to ground is above 2500 volts rms for a nominal 15 kv system.

In a specific embodiment, the control arrangement 70 includes a peak detection stage 76 responsive to the input at 56, a storage capacitor 78 supplied by the peak detection stage 76, which supplies one input to a comparator stage 80 having a second input connected to a reference level signal at 82. The output 84 of the comparator 80 is utilized to supply the mosfet device at 74. Accordingly, the sensing test path 24 is open circuited at 72 whenever voltage is detected, ensuring accurate voltage sensing. Additionally, the voltage indicator arrangement 20 continues to function appropriately since the voltage is present at 18 and the sensing path signal at 24 is not needed.

In one specific embodiment, the voltage sensor 12 is implemented by a component that exhibits the general temperature characteristics, i.e. capacitance versus temperature curve, of a polyester capacitor but with a somewhat lower percentage of change. Thus, the capacitors 26 and 28 are implemented by polyester capacitors. In accordance with further aspects of the present invention, an additional capacitor, 26a and 28a, is connected across each of the capacitors 26 and 28 respectively. Specifically, the capacitors 26a and 28a are implemented by polycarbonate capacitors to reduce the overall temperature change of the parallel combination of 26, 26a and 28, 28a. For example, the parallel combination approximates the temperature variation of the voltage sensor 12. Thus, the parallel capacitor combinations 26, 26a and 28, 28a along with the voltage sensor 12 provide a stable capacitance over a wide temperature range which ensures a constant sensed voltage signal at 60 for the voltage sensing arrangement 10. In one specific implementation, the capacitors 26, 28 are 1.0 microfarad polyester capacitors, and the capacitors 26a, 28a are 0.47 microfarad polycarbonate capacitors.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A voltage sensing arrangement comprising:
    a voltage sensor arranged to sense the voltage on an associated power distribution line;
    first means responsive to said voltage sensor for providing an output representing the voltage on the associated power distribution line; and
    second means responsive to said voltage sensor for isolating said first means from said voltage sensor whenever voltage is not present on the associated power distribution line.

2. The voltage sensing arrangement of claim 1 further comprising third means responsive to the presence of voltage on the associated power distribution line for isolating a test path from said voltage sensor.

3. The voltage sensing arrangement of claim 1 wherein said second means comprises a voltage-responsive switch for selectively connecting said voltage sensor to said first means.

4. The voltage sensing arrangement of claim 3 wherein said voltage-responsive switch comprises voltage-responsive conductive means electrically connected in series with light-emitting means.

5. The voltage sensing arrangement of claim 4 wherein said voltage-responsive switch further comprises photo-controlled switch means associated with said light-emitting means.

6. The voltage sensing arrangement of claim 5 wherein said photo-controlled switch means is electrically connected in series with said voltage sensor and said first means.

7. The voltage sensing arrangement of claim 2 wherein said third means comprises comparator means responsive to said first means for comparing said output with a predetermined reference voltage.

8. The voltage sensing arrangement of claim 7 wherein said third means further comprises switch means responsive to said comparator means for selectively controlling the connection of said test path and said voltage sensor.

9. The voltage sensing arrangement of claim 8 wherein said comparator controls said switch means to connect said test path and said voltage sensor when said output exceeds said predetermined reference voltage.

10. The voltage sensing arrangement of claim 1 wherein said voltage sensor presents an equivalent capacitance and said first means includes sensing capacitor means connected to said voltage sensor, said sensing capacitor means including temperature compensation means for compensating for the variations in said equivalent capacitance versus temperature.

11. The voltage sensing arrangement of claim 10 wherein said temperature compensation means includes the parallel combination of two capacitors having different temperature characteristics.

12. The voltage sensing arrangement of claim 11 wherein said two capacitors include a polyester capacitor and a polycarbonate capacitor.

13. A temperature compensation arrangement for a voltage sensor having an equivalent capacitance and a predetermined temperature characteristic, the temperature compensation arrangement comprising the parallel combination of two capacitors having different temperature characteristics arranged in series with the voltage sensor.

14. The temperature compensation arrangement of claim 13 wherein said two capacitors include a polyester capacitor and a polycarbonate capacitor.

15. A voltage sensing arrangement comprising:
    a voltage sensor arranged to sense the voltage on an associated power distribution line;
    first means responsive to said voltage sensor for providing an output representing the voltage on the associated power distribution line; and
    second means responsive to the presence of voltage on the associated power distribution line for isolating a test path from said voltage sensor.

16. The voltage sensing arrangement of claim 15 further comprising third means responsive to said voltage sensor for isolating said first means from said voltage sensor whenever voltage is not present on the associated power distribution line.

* * * * *